United States Patent [19]
Raum

[11] Patent Number: 5,622,252
[45] Date of Patent: Apr. 22, 1997

[54] REDUCED RADIUS CONVEYOR BELT

[75] Inventor: Jack R. Raum, Winchester, Va.

[73] Assignee: Ashworth Bros., Inc., Fall River, Mass.

[21] Appl. No.: 414,500

[22] Filed: Mar. 31, 1995

[51] Int. Cl.$^6$ ................................................. B65G 21/18
[52] U.S. Cl. .......................... 198/778; 198/831; 198/852
[58] Field of Search .................................... 198/778, 831, 198/848, 852

[56] References Cited

U.S. PATENT DOCUMENTS

| | | |
|---|---|---|
| 2,872,023 | 2/1959 | Bechtel, Jr. . |
| 3,225,898 | 12/1965 | Roinestad . |
| 3,270,863 | 9/1966 | Ackles . |
| 3,333,678 | 8/1967 | Rodman ................................. 198/852 |
| 4,078,655 | 3/1978 | Roinestad . |
| 4,858,750 | 8/1989 | Cawley . |
| 4,867,301 | 9/1989 | Roinestad et al. . |
| 5,141,099 | 8/1992 | Baumgartner . |
| 5,228,557 | 7/1993 | Lago . |
| 5,271,491 | 12/1993 | Irwin ..................................... 198/778 |

FOREIGN PATENT DOCUMENTS

91/01261  2/1991  WIPO .

OTHER PUBLICATIONS

Cambridge Reduced Radius Cam–Grid® Belt and Cambri–Link® Belts Brochure, Cambridge, Inc., Cambridge, Maryland (Approximately Jan. 1995).

"New Cambridge Reduced Radius Belts Help Processors Maximize Production Throughput", Press Release, Cambridge, Inc., Cambridge, Maryland (Approximately Jan. 1995).

Primary Examiner—Joseph E. Valenza
Attorney, Agent, or Firm—Banner & Witcoff, Ltd.

[57] ABSTRACT

A conveyor belt having a direction of travel includes a plurality of pivotal transverse rods extending laterally across the belt and having inner and outer ends along inner and outer edges of the belt and a plurality of connecting links disposed in a pair of spaced rows at the inner and outer ends of the rods. Each of the connecting links has a base portion and a pair of spaced legs rigidly connected to the outer ends of the base portion and each of the legs has at least one stepped portion parallel to the direction of travel. The stepped portions on opposing legs are spaced apart a relatively narrow distance at the base portion and a relatively wide distance at the opposite end thereof. The stepped portions include a substantially straight segment at the narrower stepped portion, a substantially straight segment at said wider stepped portion, and an angled segment therebetween connecting the substantially straight segments. The angled segment between the substantially straight segments of the stepped portion of the inner connecting links is greater in length than the angled segment between the substantially straight segments of the stepped portion of the outer connecting links. The shorter length of the outer angled segments maintains the direction of travel of the belt in a normal straight orientation by limiting the amount of lateral clearance between adjoining connecting links and the longer length of the inner angled segments allow adjoining inner links to fully collapse in an alternate orientation to follow paths curved laterally to one side.

15 Claims, 18 Drawing Sheets

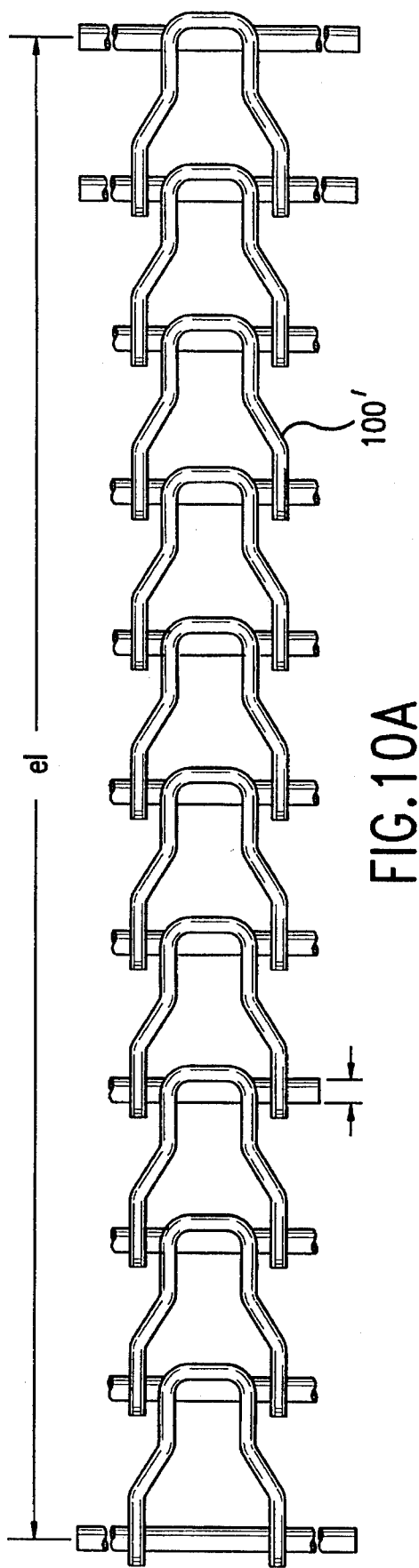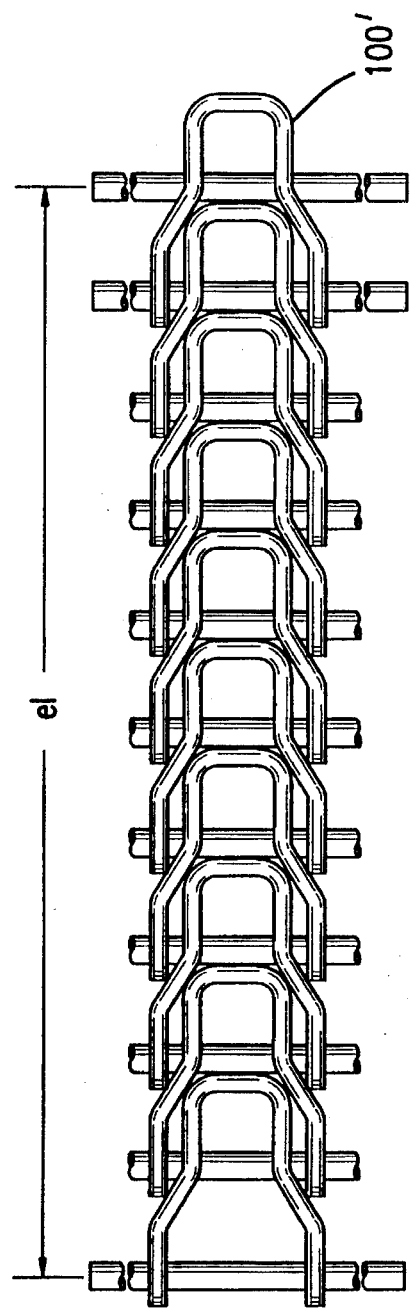

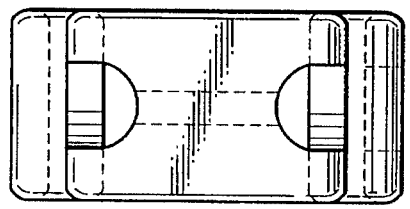
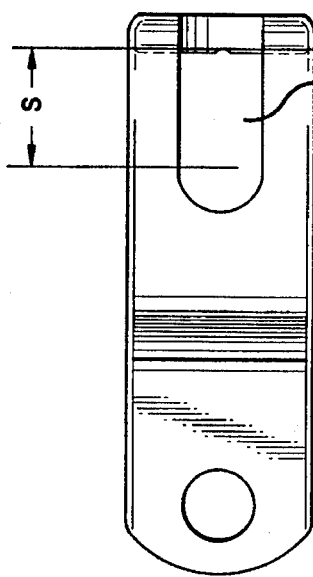
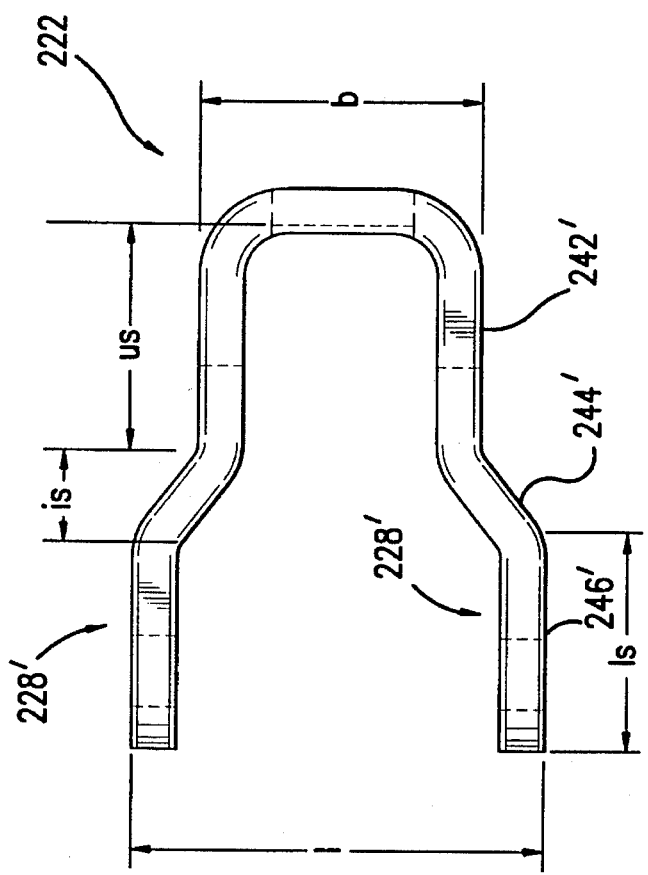

REDUCED RADIUS CONVEYOR BELT

TECHNICAL FIELD

The present invention relates generally to conveyor systems and belts therefor and, more particularly, to conveyor belts capable of traversing reduced radius horizontal curves.

BACKGROUND OF THE INVENTION

Among the many types of conveyor belts in general use today for carrying diverse products along both straight and horizontally curved paths, two types are grid conveyor belts and flat wire conveyor belts. A grid belt is illustrated in U.S. Pat. No. 3,225,898, as well as in FIGS. 1 and 2. Such a belt comprises a plurality of spaced transverse rods slidably interconnected by two rows of connecting links disposed along the inner and outer edges of the rods. The connecting links are disposed in a nested relationship relative to one another with slots in the links slidably receiving the rods. Generally in the prior art, either edge of the belt can suitably collapse when it is necessary for the belt to travel around a horizontal curve.

Grid belts have enjoyed substantial commercial success because of their ability to traverse horizontal curves while still providing an integrated carrying surface capable of supporting a great variety of products. Another desirable feature of such belts is that they can pass freely in vertical curves around relatively small end pulleys. Assuming commonly used link dimension, a typical prior art grid type belt has an inside turn radius in the direction of arrow "A"0 of approximately 2.2 times the width of the belt, as shown in FIG. 3. This is a relatively large horizontal turn radius and is a serious limitation on the use of grid belts due to the resultant inefficient utilization of available floor space.

One of the more significant factors dictating the turn radius for which a conveyor belt can be designed is the internal clearance between the mating links when in the extended position. That is, in order to reduce the turn radius of the belt about a horizontal curve, the links must have an internal clearance great enough to allow the maximum collapse of one link within another link. This requires a significant amount of internal clearance, however, and can cause the belt to run crooked or deviate from a desired straight travel path to a degree unacceptable to the conveyor user. The rods will also not usually be perpendicular to the direction of travel, thus making the conveyor run out-of-square. As shown in FIGS. 1 and 2, two of the commonly used links in a grid conveyor belt have an accumulated lateral clearance, or "shug", of 0.17 and 0.49 inches, respectively, over twelve pitches or links. This distance is noted by the reference "sh" in the drawings. The link dimensions for the belt of FIG. 2 are discussed below with reference to FIG. 3. Thus, the link configurations used to control the shug to an acceptable amount in these belts results in a belt limitation of having a relatively large 2.2 turn ratio.

A small radius conveyor belt, such as that described in U.S. Pat. No. 4,078,655 which is hereby incorporated by reference, overcomes this relatively large turn radius limitation, and thereby further expands the usefulness of grid belts in a variety of conveyor installations such as the spiral conveying systems disclosed in U.S. Pat. Nos. 3,348,659, 3,682,295 and 4,078,655, the contents of which are hereby incorporated by reference. In spiral systems, the belt travels in a spiral direction, and is driven by a cage-like driving drum that is located within the spiral. The small radius conveyor belt of the '655 patent achieves an inside turn radius of approximately 0.9–1.1 times the width of the belt by using tractive central links in combination with inner and outer edge links which are longitudinally expandable and collapsible. The inner links are fully expanded and the outer links are collapsed while moving in a straight path. The inner links then collapse and the outer links expand to allow the belt to traverse a horizontal curve. The small radius belt of the '655 patent is more expensive to manufacture than a typical grid belt, however, due to its more complex structure. In addition, the presence of the central links may be objectionable in certain instances because it limits the quantity of product that can be supported on the belt and it disturbs the even distribution of product on the support area.

SUMMARY OF THE INVENTION

The present invention provides a grid conveyor belt having a plurality of transversely disposed rods connected by end rows of substantially longitudinally disposed link members. Each link member has a pair of longitudinally spaced first openings extending laterally therethrough. A plurality of pivotal transverse rods extending laterally across the belt and through the first openings in order to interconnect the links in transverse rows. The plurality of connecting links includes edge links positioned adjacent the inner and outer edges of the belt.

Each of the connecting inner and outer links has a base portion and a pair of spaced legs rigidly connected to the outer ends of the base portion. In a preferred embodiment, each of the legs has at least one stepped portion parallel to the direction of travel. The stepped portions on opposing legs are spaced apart a relatively narrow distance at the base portion and a relatively wide distance at the opposite end thereof. The stepped portions include a substantially straight length at the narrower stepped portion, a substantially straight length at the wider stepped portion, and an angled segment therebetween connecting the substantially straight lengths.

The links are arranged in a partially nested relation with the narrower stepped portions of the links being received in closely fitting sliding relation within the wider stepped portions of adjoining links. The angled segment between the substantially straight lengths of the stepped portion of the inner connecting links is greater in length than the angled segment between the substantially straight lengths of the stepped portion of the outer connecting links. Thus, the shorter length of the outer angled segments maintains the direction of travel of the belt in a normal straight orientation by limiting the amount of lateral clearance between adjoining connecting links, and the longer length of the inner angled segments allows adjoining inner links to fully collapse in an alternate orientation to follow paths curved laterally to one side.

A further embodiment of the present invention provides a conveyor belt having a normal orientation to follow one path and an alternate orientation to follow an alternate path curved laterally to one side of said one path. The belt includes plurality of longitudinally spaced rods extending laterally across the belt and having inner and outer ends along inner and outer edges of the belt and central portions therebetween. Links are arranged in at least one longitudinal row along each edge of the belt for pivotally interconnecting the inner and outer ends of said rods. The inner and outer links have a normal fully expanded and tractive condition in the normal orientation, the inner links have a fully collapsed condition in the alternate orientation and the outer links maintain their fully expanded and tractive condition in the alternate orientation. The collapsibility of the inner links means is greater than the collapsibility of the outer links such that a reduced radius of curvature is obtained along the inner edge and the overall shug of the belt is acceptable.

In a further preferred embodiment, the tractive links include inner links pivotally interconnecting inner portions of the rods and outer links pivotally interconnecting outer portions of the rods and central links disposed therebetween. The inner links have a normal fully expanded and tractive condition in a normal orientation along a path. The outer links have a normal collapsed condition in the normal orientation and are then expanded from their normal condition in order to follow alternate paths curved laterally to one side. The angled segment between the substantially straight lengths of the stepped portion of the inner links is greater in length than the angled segment between the substantially straight lengths of the stepped portion of the outer links. Thus, the shorter length of the outer angled segments maintains the direction of travel of the belt in a normal straight orientation by limiting the amount of lateral clearance between adjoining links and the longer length of the inner angled segments allows adjoining inner links to fully collapse in an alternate orientation to follow paths curved laterally to one side.

The conveyor belt of the present invention is particularly well suited for use in a spiral conveyor system or other edge drive conveyor system because of its ability to transverse horizontal curves of a reduced radius. The utilization of inner and outer links having varying collapsed and expanded conditions further enhances the ability of the belt to transverse horizontal curves and is particularly well suited for small radius spiral conveyor systems.

BRIEF DESCRIPTION OF THE DRAWINGS

The novel features of the invention are set out with particularity in the appended claims, but the invention will be understood more fully and clearly from the following detailed description of preferred embodiments with reference to the accompanying drawings in which:

FIG. 10 (A)–(B) is an illustration of the pitch of the link shown in FIG. 8 in an expanded condition and in a collapsed condition;

FIG. 18 (A)–(C) is a plan, end and side view of the central link configuration shown in the conveyor belt of FIG. 16.

DESCRIPTION OF PREFERRED EMBODIMENTS

Figure 6:
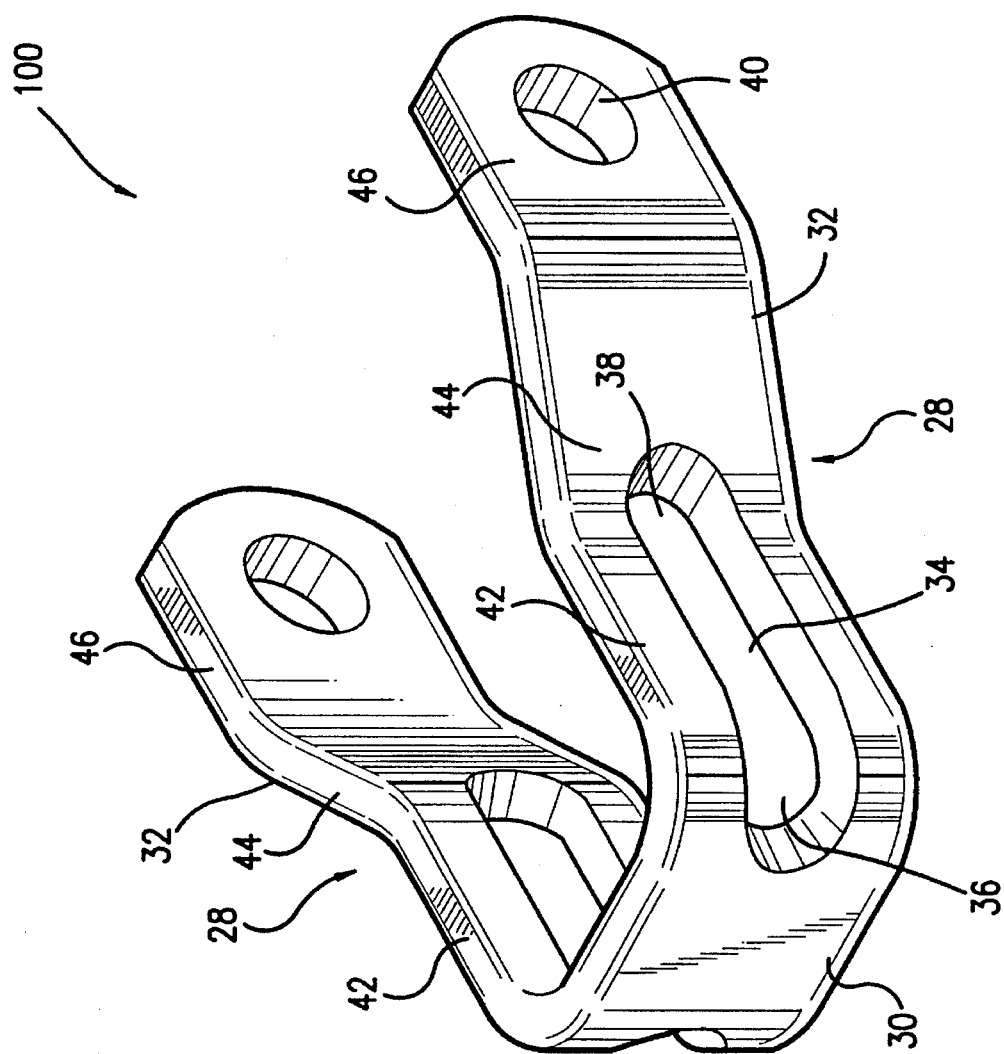
FIG. 6 is a perspective view of a maximum collapse link in accordance with the present invention.
Figure 12:
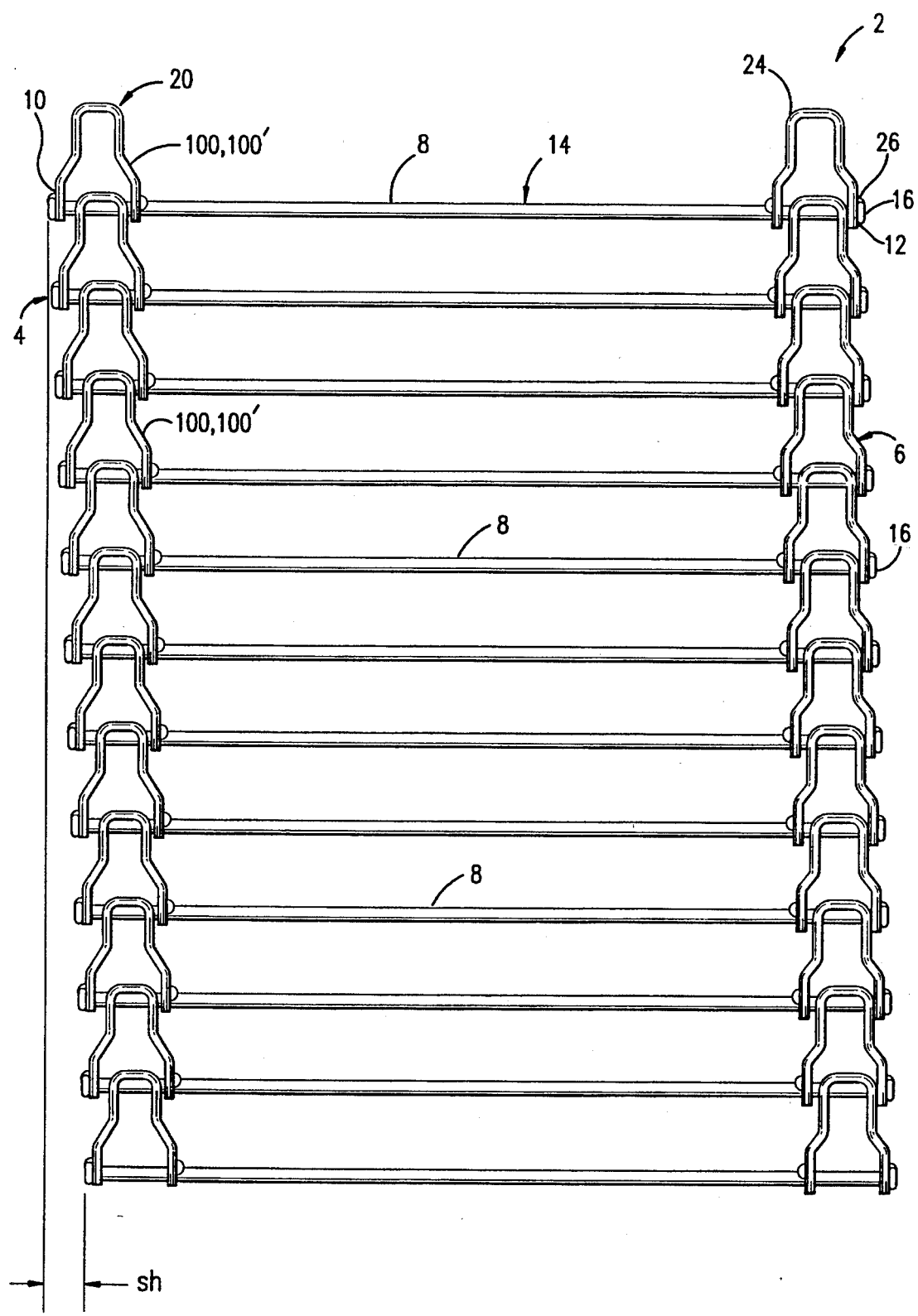
FIG. 12 is a plan view of a conveyor belt in accordance with a first embodiment of the present invention.

Referring to FIGS. 6–8, a maximum collapse link 100 for use in a reduced radius conveyor belt 2 is shown according to a first embodiment of the present invention. Belt 2 is illustrated in FIG. 12 in a normal orientation for travelling in a straight path and in FIG. 13 in an alternate orientation for following horizontally curved paths.

Belt 2 is a grid type belt comprising a plurality of longitudinally spaced, transversely extending rods 8. Rods 8 have inner and outer ends 10 and 12 located respectively along the inner and outer edges 4 and 6 of belt 2 with central portions 14 extending between the inner and outer ends 10 and 12. Each of the rod ends 10 and 12 is provided with an integral, enlarged head 16.

Pivotally interconnecting the rods 8 are a row of inner links 20 connecting the inner ends 10 of the rods 8 and a row of outer links 24 connecting the outer ends 12 of the rods 8. Inner and outer links 20 and 24 are rigidly secured by welded attachments 26 to the enlarged heads 16 on the rod ends. However, any other suitable means of laterally fixing the connecting links to the rods 8 could also be used.

Each of the connecting links 20, 24, in their respective preferred form, comprises two transversely spaced, longitudinally extending legs 28 connected together at one end by a base portion 30. Legs 28 have at least one stepped portion 32 resulting in base portion 30 being narrower than legs 28 at their free ends and allowing the links to be suitably nested together with the narrow base portion 30 received between the free ends of the legs 28 of an adjoining link. Stepped portions 32 include an upper substantially straight link segment 42 adjacent base portion 30, an intermediate link segment 44 extending rearward generally at an angle, and a lower substantially straight link segment 46 at the free end of the legs 28. Stepped portions 32 generally increase the lateral stability of the links and the belt 2 in that the intermediate portions of each of the links fit in a relatively close sliding relationship between the legs 28 of nested adjoining links. In fact, as discussed further below, it is the design of intermediate link segment 44 in conjunction with the upper and lower substantially straight segments 42 and 46 which is determinative of the nestability or collapsibility of the link as well as the lateral stability of the belt.

The legs of each of the links 20, 24 are provided with longitudinally extending slots 34 positioned adjacent the base portion 30 of the links. The front end 36 of each slot is located directly adjacent base portion 30 which thus forms a front bearing surface for a rod 8 slidably received in slot 34. Similarly, the rear end 38 of each slot 34 can form a rear bearing surface for the rod 8. A circular opening 40 is also provided in each of the legs 28 adjacent the free end thereof for receiving an adjoining rod 8 in a close fitting relationship. Rods 8 are freely pivotal in the slots 34 so that belt 2 is vertically flexible to pass vertically around suitable end pulleys in a typical conveyor installation.

Figure 1:
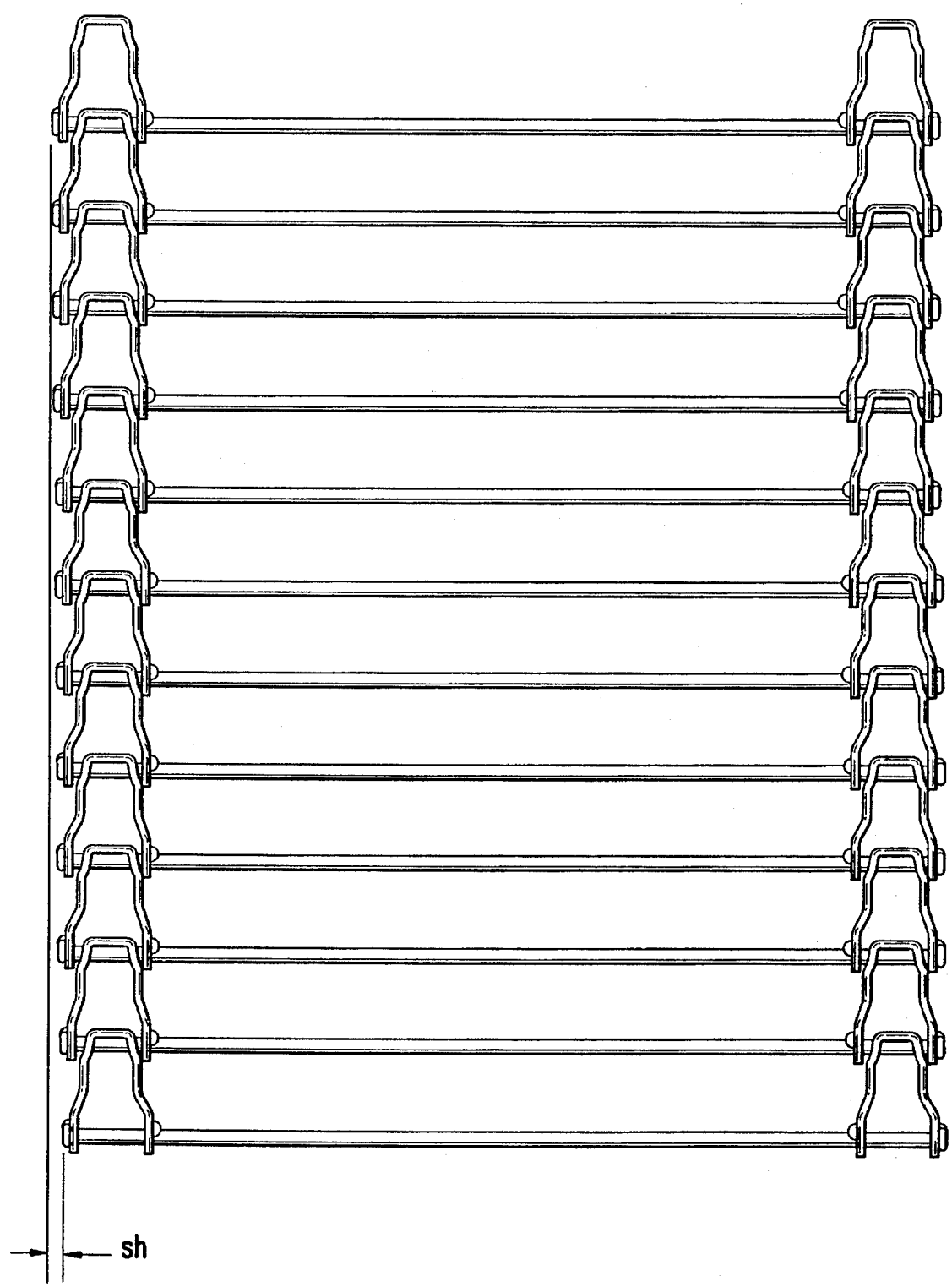
FIG. 1 is a plan view of a prior art conveyor belt having a standard link configuration in a normal orientation to follow a straight path.
Figure 2:
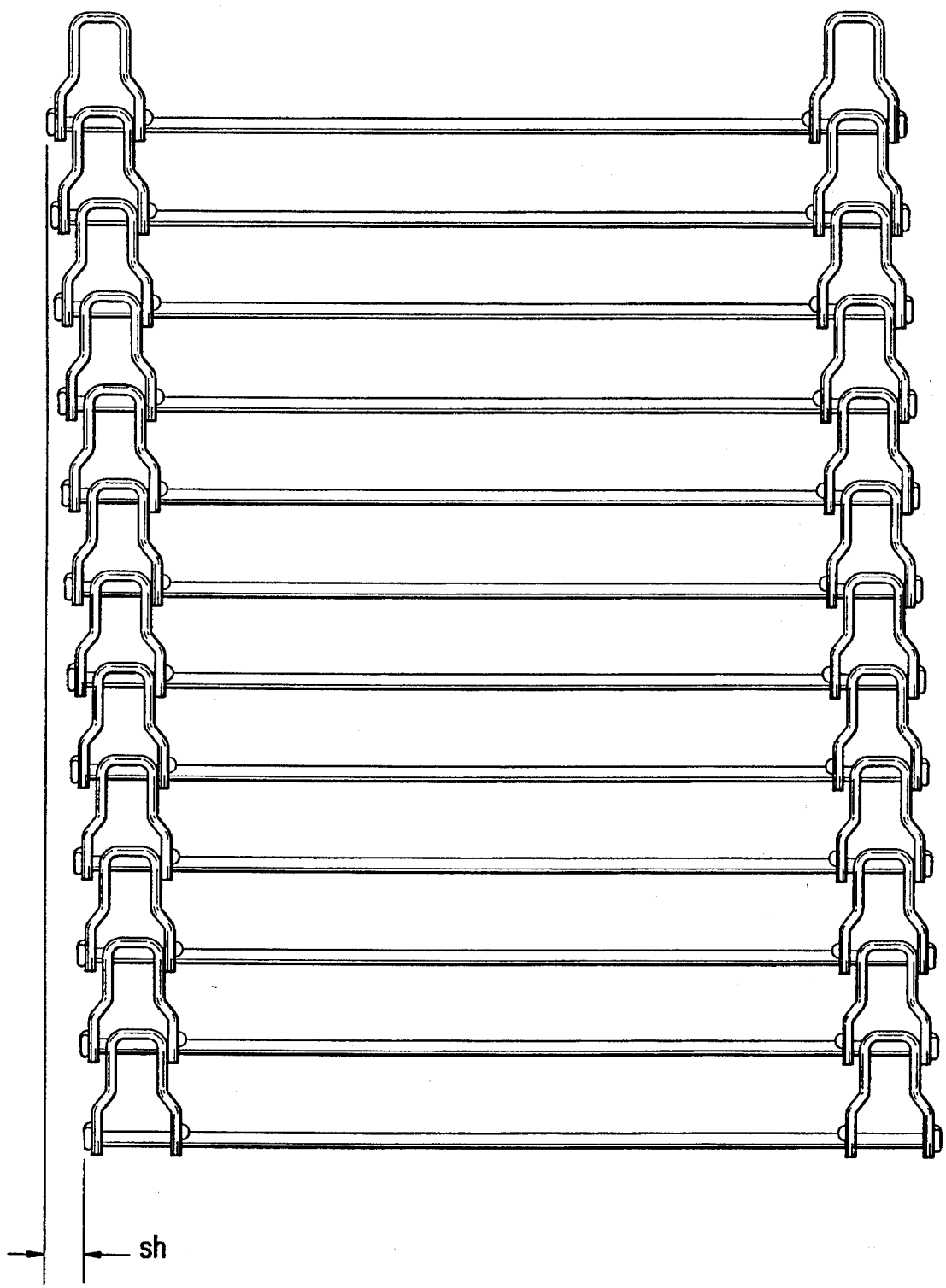
FIG. 2 is a plan view of a prior art conveyor belt having a heavy duty link configuration in a normal orientation to follow a straight path.
Figure 3:
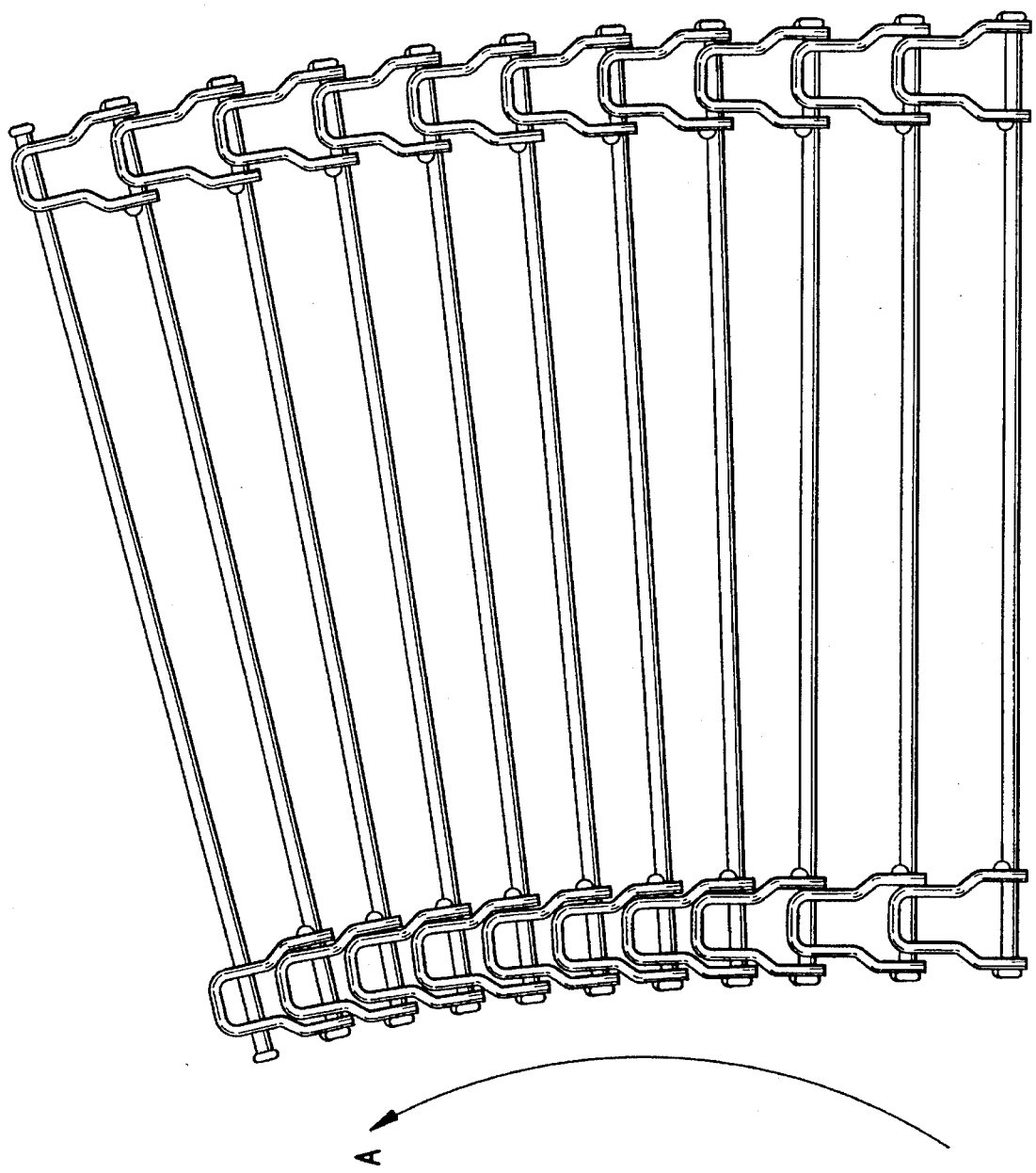
FIG. 3 is a plan view of the conveyor belt of FIG. 2 in an alternate orientation to follow a laterally curved path.

As illustrated in FIG. 6, a maximum collapse link 100 in accordance with the present invention has an extended intermediate segment 44 in comparison with the standard and heavy duty link configurations of the prior art, as shown in FIGS. 1 and 2. The substantially straight link segments 42 and 46 of link 100 are also shortened in order to maintain the same overall length of link 100. The space between the free ends of legs 28 in link 100 is slightly greater than that of conventional links and the base portion 30 of link 100 is narrower than the base portion of prior links in order to maximize the collapse of link 100. There is thus an increased differential between the width of base portion 30 and the free ends of spaced legs 28. As a result, a greater percentage of link 100 can be received between legs 28 of an adjoining maximum collapse link 100 and a greater degree of nestability or collapsibility of the links is achieved.

Figure 4B:
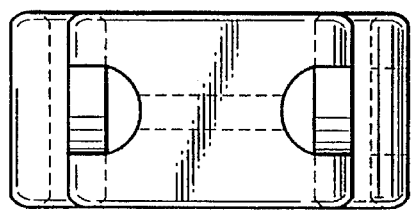
FIG. 4 (A)–(C) is a plan, end and side view of the heavy duty link shown in the belt of FIG. 2.
Figure 4C:
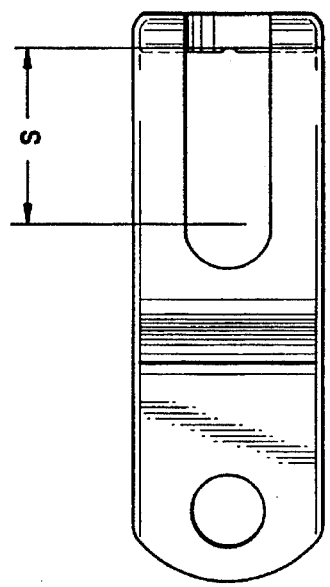
Figure 4A:
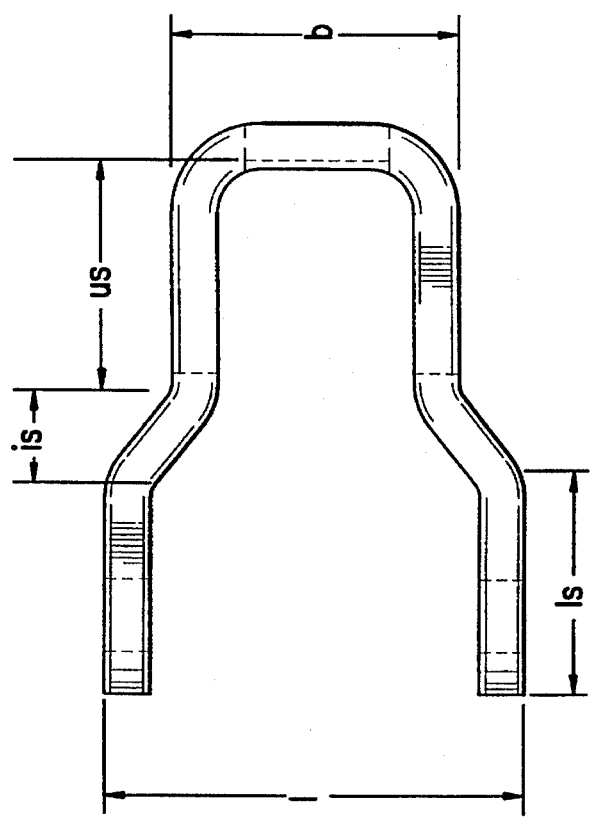
Figure 5A:
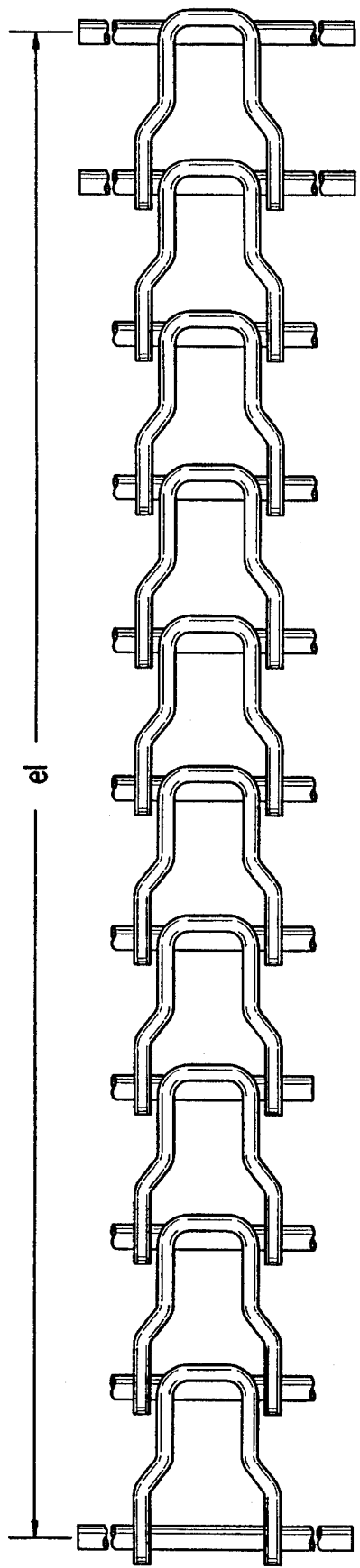
FIG. 5 (A)–(B) is an illustration of the pitch of the link shown in FIG. 4 in an expanded condition and in a collapsed condition.
Figure 5B:
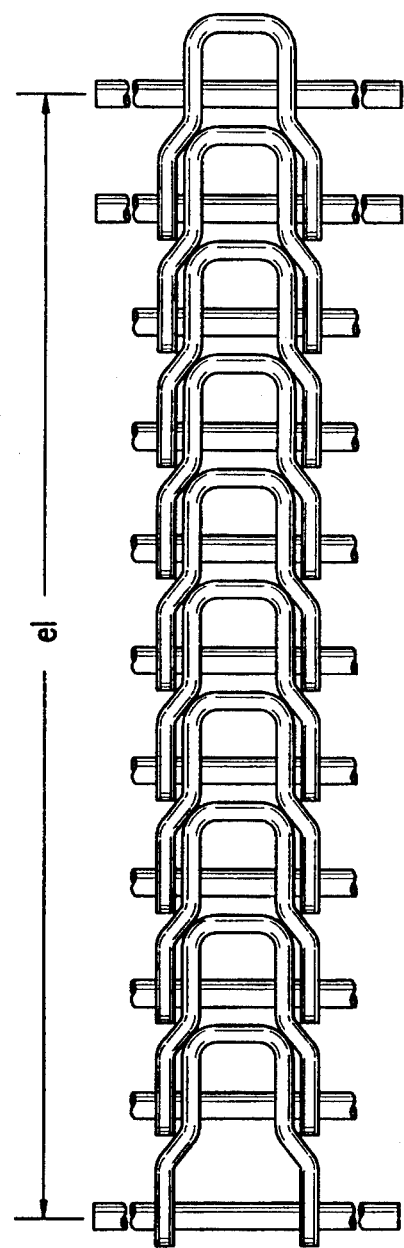

More specifically, as shown in FIG. 4(A)–(C), a typical prior art link, having a link thickness of 0.105", has a base portion width (b) of 0.76" and a center distance (1) between the free ends of the legs of 1.075". The upper substantially straight link segment has a length (us) of 0.60", the intermediate link segment has a length (is) of 0.24", and the lower substantially straight link segment has a length (ls) of 0.64". The length of the slot (s) is 0.45". As a result, as illustrated in FIG. 5(A)–(B), the prior art link had an extended length (el) over ten links of 10.906" and a collapsed length (cl) over ten links of 7.375". The radius of curvature thus achieved by the prior art was 2.2 times the width of the belt.

Figure 7B:
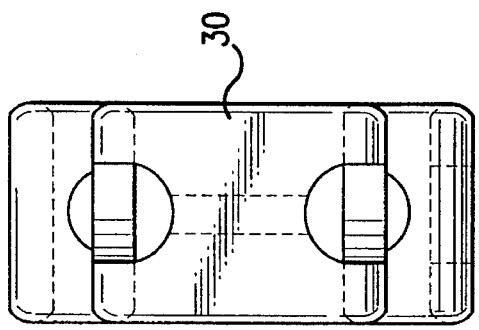
FIG. 7 (A)–(C) is a plan, end and side view of a maximum collapse link in accordance with a first embodiment of the present invention.
Figure 7C:
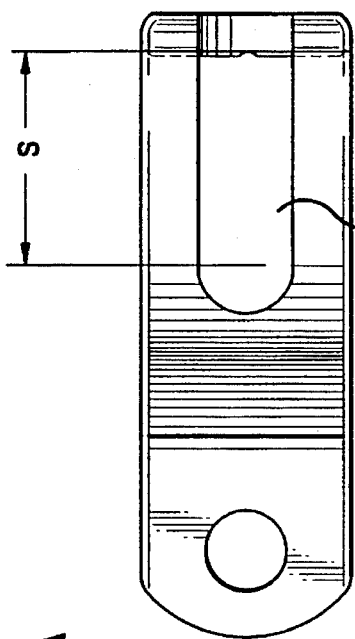
Figure 7A:
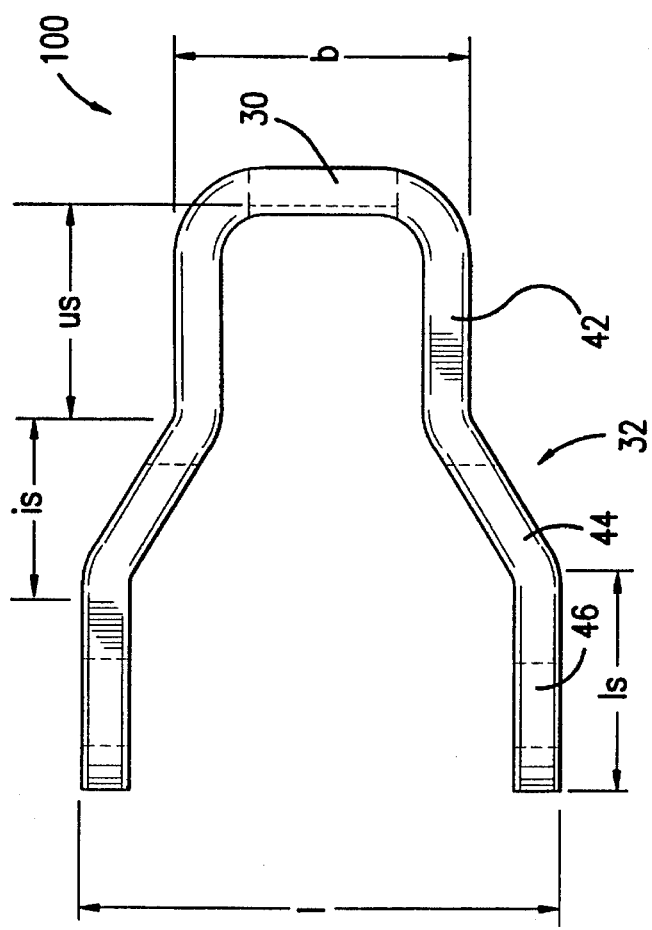
Figure 9A:
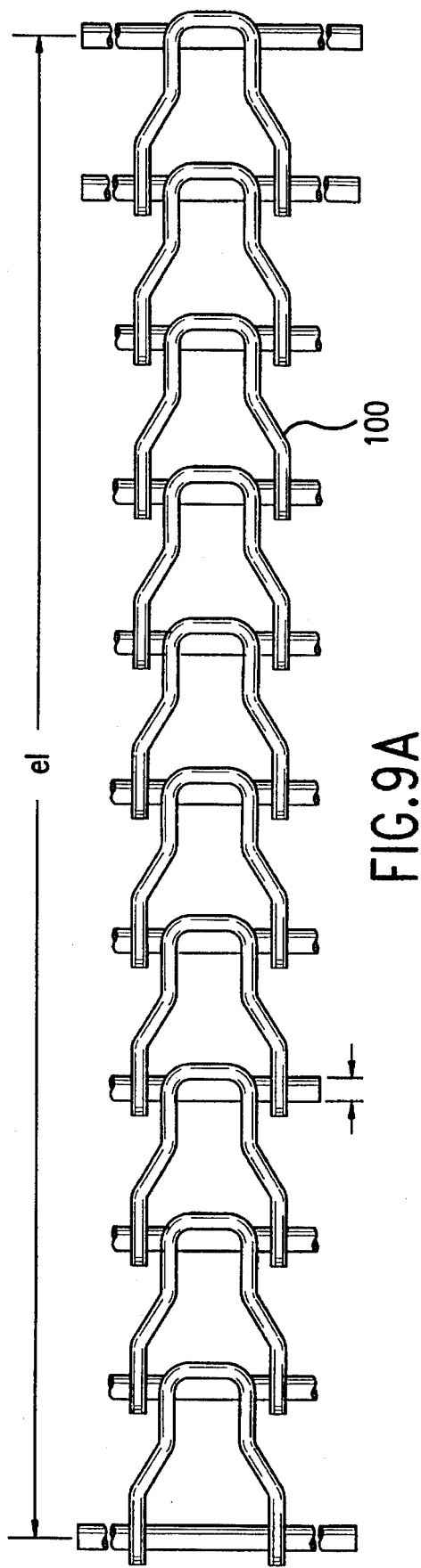
FIG. 9 (A)–(B) is an illustration of the pitch of the link shown in FIG. 7 in an expanded condition and in a collapsed condition.
Figure 9B:
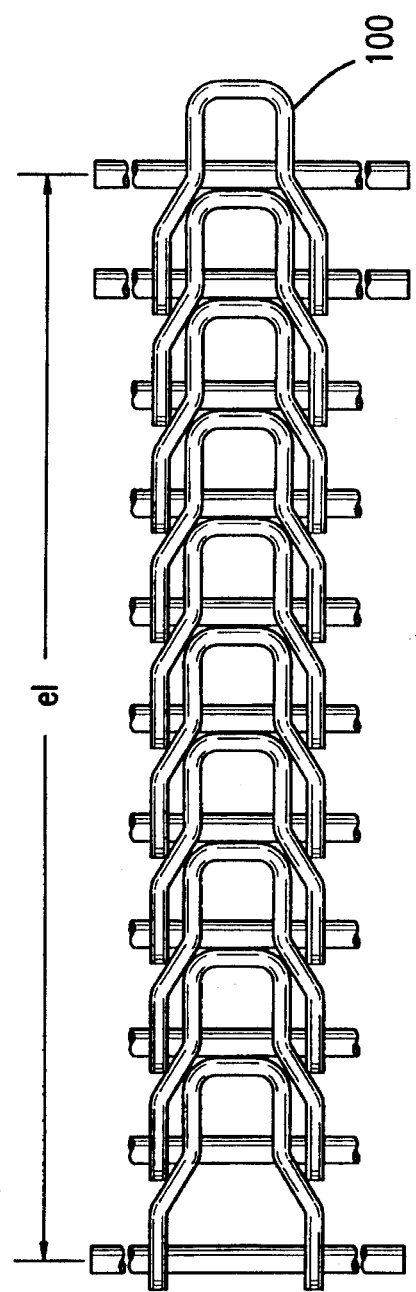

Referring also to FIG. 7(A)–(C), in a preferred embodiment of the present invention link 100 has a link thickness of 0.090". Link 100 has a narrower base portion 30 with a width (b) of 0.70" and a greater outer distance (1) between the free ends of the legs of 1.140". The upper substantially straight link segment 42 has a shorter length (us) of 0.50", the intermediate link segment 44 has a longer length (is) of 0.44" and the lower substantially straight link segment 46 has a shorter length (ls) of 0.53". The length (s) of slot 34 is also increased to 0.51". These link dimensions combined with the longer slot length (s) enables link 100 to achieve a maximum collapsed condition. Referring to FIG. 9(A)–(B), link 100 has an extended length (el) over ten links of 10.906", the same as the prior art link shown in FIG. 5(A). However, link 100 has a collapsed length (cl) over ten links of 6.773" compared to 7.375" for the prior art. The reduction in collapsed length is directly related to a smaller radius of curvature for the conveyor belt.

Figure 8B:
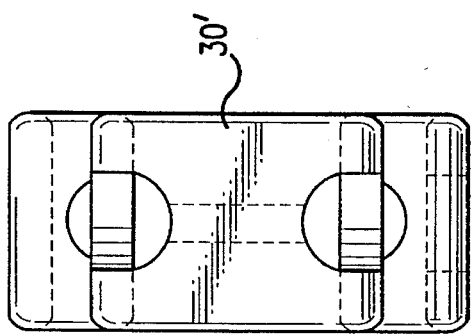
FIG. 8 (A)–(C) is a plan, end and side view of a maximum collapse link in accordance with a further embodiment of the present invention.
Figure 8A:
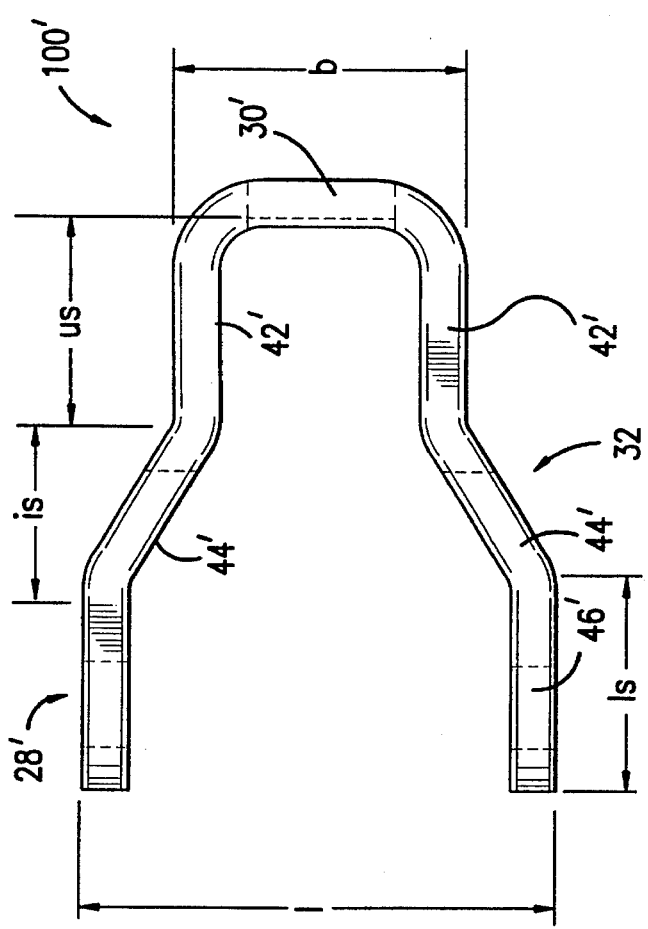
Figure 8C:
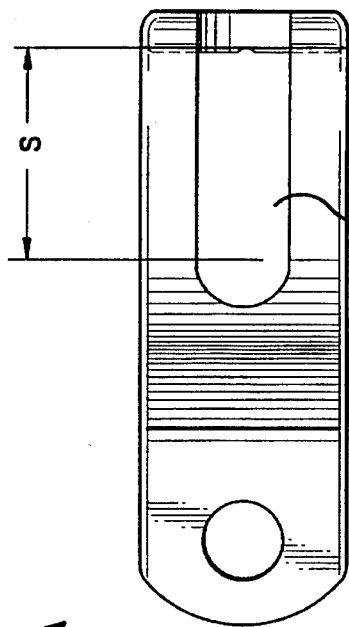

Referring to FIG. 8(A)–(C), in a further embodiment of the present invention link 100' has a link thickness of 0.105". In this embodiment, link 100' has the same narrower base portion 30' with a width (b) of 0.70" but a greater outer distance (1) between the free ends of legs 28' of 1.140". The upper substantially straight link segment 42' has the same length (us) as link 100 and intermediate link segment 44' has the same length (is) as link 100, but the lower substantially straight link segment 46' has a length (is) of 0.54" that is slightly longer than link 100. The slot 34' has the same length (s) as slot 34 for link 100. Thus, link 100' achieves a maximum collapse condition similar to that of link 100. Referring to FIGS. 10(A)–(B), link 100' has an extended length (el) over ten links of 10.906", the same as that shown for link 100. Link 100' has a collapsed length (cl) over ten links of 6.875", which is slightly greater than that achieved by link 100 but still a substantial improvement over the prior art. The variance in values between link 100' and link 100 is attributable to the increased thickness of the link material itself, i.e., 0.090" compared to 0.105". The objective in the present invention is to maintain a sufficiently sturdy link configuration yet still achieve the maximum degree of link collapse. As illustrated, link thicknesses between approximately 0.105" and 0.090" are best suited for meeting this objective.

Figure 11:
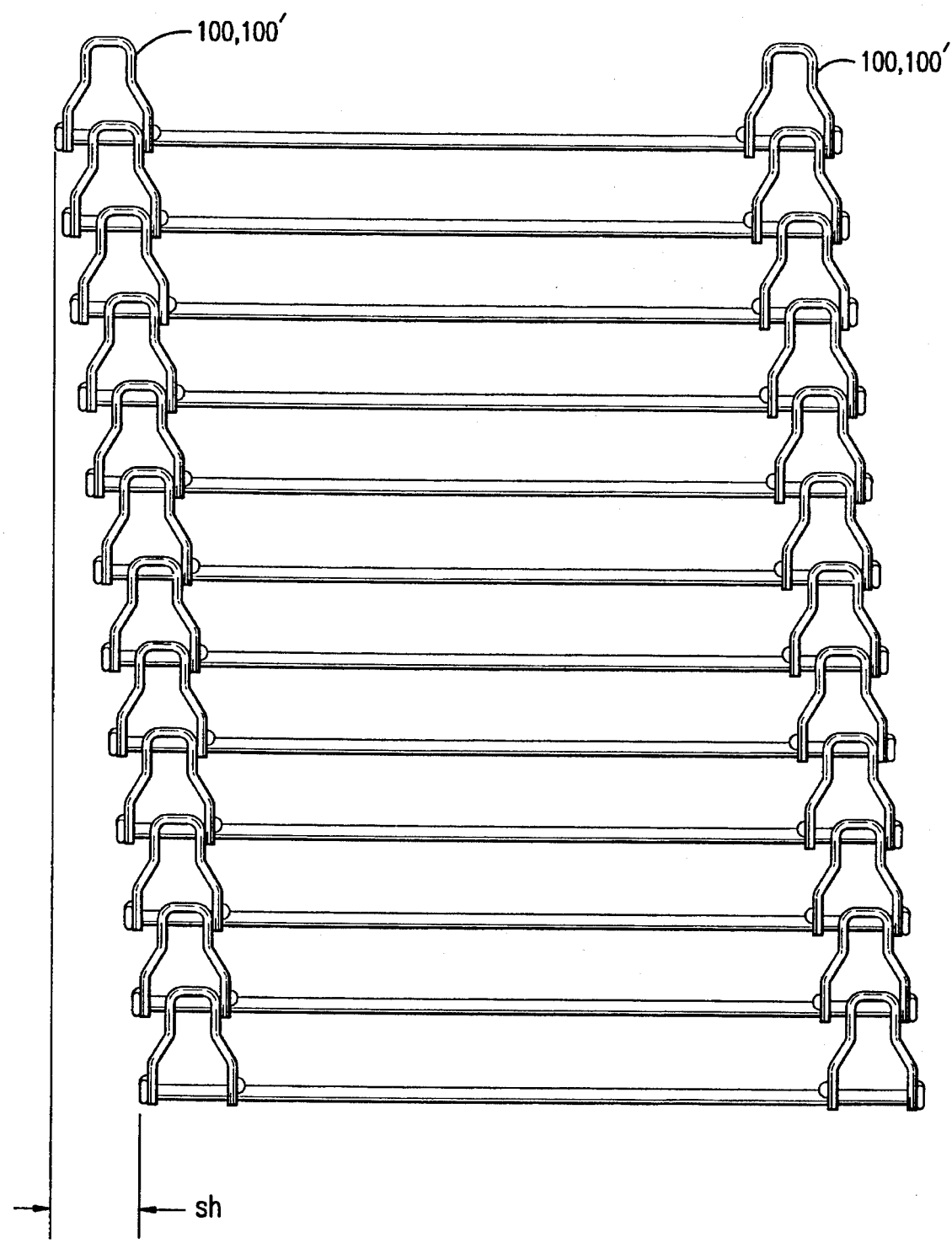
FIG. 11 is a plan view of a conveyor belt having a maximum collapse link configuration on the inner and outer edges.

Ideally, maximum collapse link 100, 100' as just described above would be utilized for both the inner links and the outer links of the conveyor belt in order to achieve a maximum collapse condition at both edges and thus achieve a reduced turn radius along horizontal turns in both directions. Unfortunately, if such a conveyor belt is constructed, the increased differential between the width of base portion 30, 30' and the free ends of spaced legs 28, 28' also increases the lateral clearance or shug over successive links. As shown in FIG. 11, when both inner and outer links having the configuration of maximum collapse link 100, 100' are used in the conveyor belt, the accumulated lateral clearance or shug (sh) over 12 pitches is 1.37". This amount of shug would be unacceptable, would lead to lateral instability of the conveyor belt and would thus cause the belt to run crooked or deviate from a desired straight travel path to a degree unacceptable to the conveyor user.

The present invention overcomes the disadvantages of the increased shug when using maximum collapse link 100, 100'; yet still maintains the full benefit of increased collapsibility and reduced radius of turn. In the preferred embodiments of the present invention shown in FIGS. 12 and 13, inner links 20 are configured with an increased stepped portion 32 as in the design of maximum collapse link 100, 100' in order to achieve the maximum amount of nestability along the inner edge. The term maximum collapse in the present invention implies that the transverse rods 8 contacting the base portions 30 of the links limits the further nesting of the links—not the configuration of the link itself. Outer links 24 are configured with a conventional stepped portion in order to maintain an acceptable amount of shug within the conveyor belt. Thus, inner links 20 in accordance with the present invention have an extended intermediate segment 44, 44' that is longer than the intermediate segment of outer links 24. In order to maintain transverse rods 8 in parallel relation within belt 2, the substantially straight link segments 42, 42' and 46, 46' of inner links 20 are also shortened. As a result, unlike conventional grid or flat wire belts which can collapse along either edge, belt 2 according to the present invention can only achieve maximum collapse along its inner edge 4. Outer edge 6 can be collapsed from its normal orientation, but not to the maximum degree. Therefore, belt 2 is adapted to traverse horizontal curves all of which bend in the same directions, i.e., to the same side, relative to the normal straight path.

Figure 13:
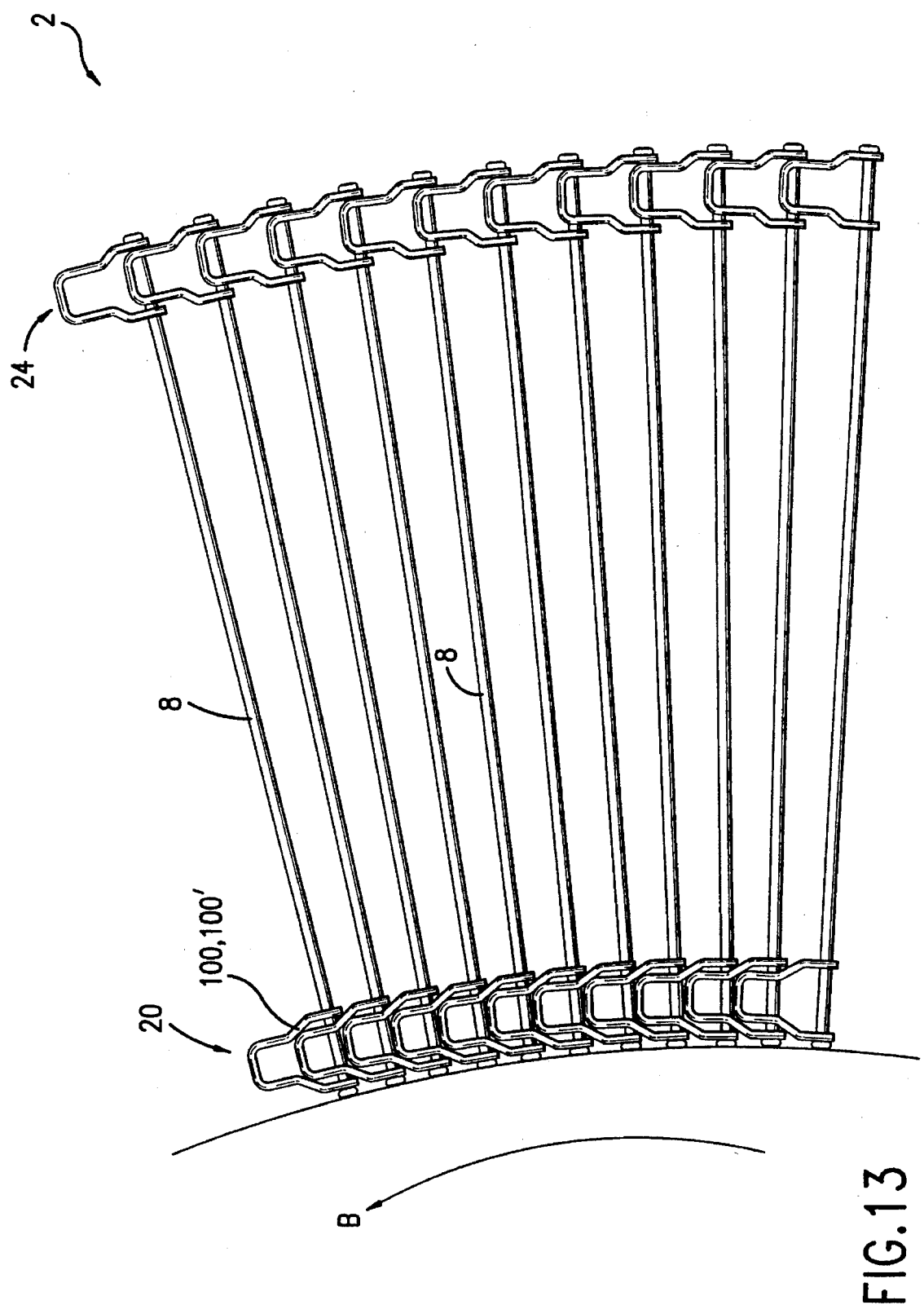
FIG. 13 is a plan view of the conveyor belt of FIG. 12 in an alternate orientation to follow a laterally curved path.

Referring now to FIG. 12, when conveyor belt 2 is travelling in its normal orientation to follow a straight path, the inner and outer links 20 and 24 are fully expanded with the rods 8 engaging the base portion 30, 30' of each of the links in a tractive driving relationship. Consequently, the entire tractive load on belt 2 is being shared between the inner and outer links 20 and 24. Such a sharing of the load is desirable since the tractive load on belt 2 arising from a conventional drive, such as a sprocket, may be quite high over a long straight path. Referring now to FIG. 13, as the belt 2 moves from its normal orientation to an alternate orientation for following a laterally curved path in the direction of arrow "B", the inner links 20 immediately begin collapsing from their fully expanded position in order to traverse the curve while the outer links 24 remain approximately in their fully expanded position. In this tractive condition, the tractive load on belt 2 is transferred from the inner and outer links in the normal straight orientation to the outer links 24 alone in the alternate curved orientation.

It can be shown mathematically and experimentally that the belts according to the above embodiment can traverse much tighter radius curves than belts of the prior art. Assuming commonly used link dimensions, it can be shown that the minimum inside radius for a typical prior art grid type belt as shown in U.S. Pat. No. 3,225,898, is 2.14–2.2 times the width of the belt. In contrast, the grid type belt 2 according to the present invention can traverse a curve having a minimum radius of 1.6–1.7 times the width of the belt. The ability of belts according to the present invention to traverse much tighter curves for a given width belt is a significant advantage to the load which it can carry. That is, in a spiral low tension conveying system, such as that shown in U.S. Pat. Nos. 3,348,659 and 3,682,295, the maximum allowable loading on the conveyor belt is inversely proportional to the minimum radius which the belt can transverse. Accordingly, by reducing the turn radius of belt 2 to 1.6–1.7 times the width of the belt, the present invention increases the allowable loading on belt 2.

Figure 14:
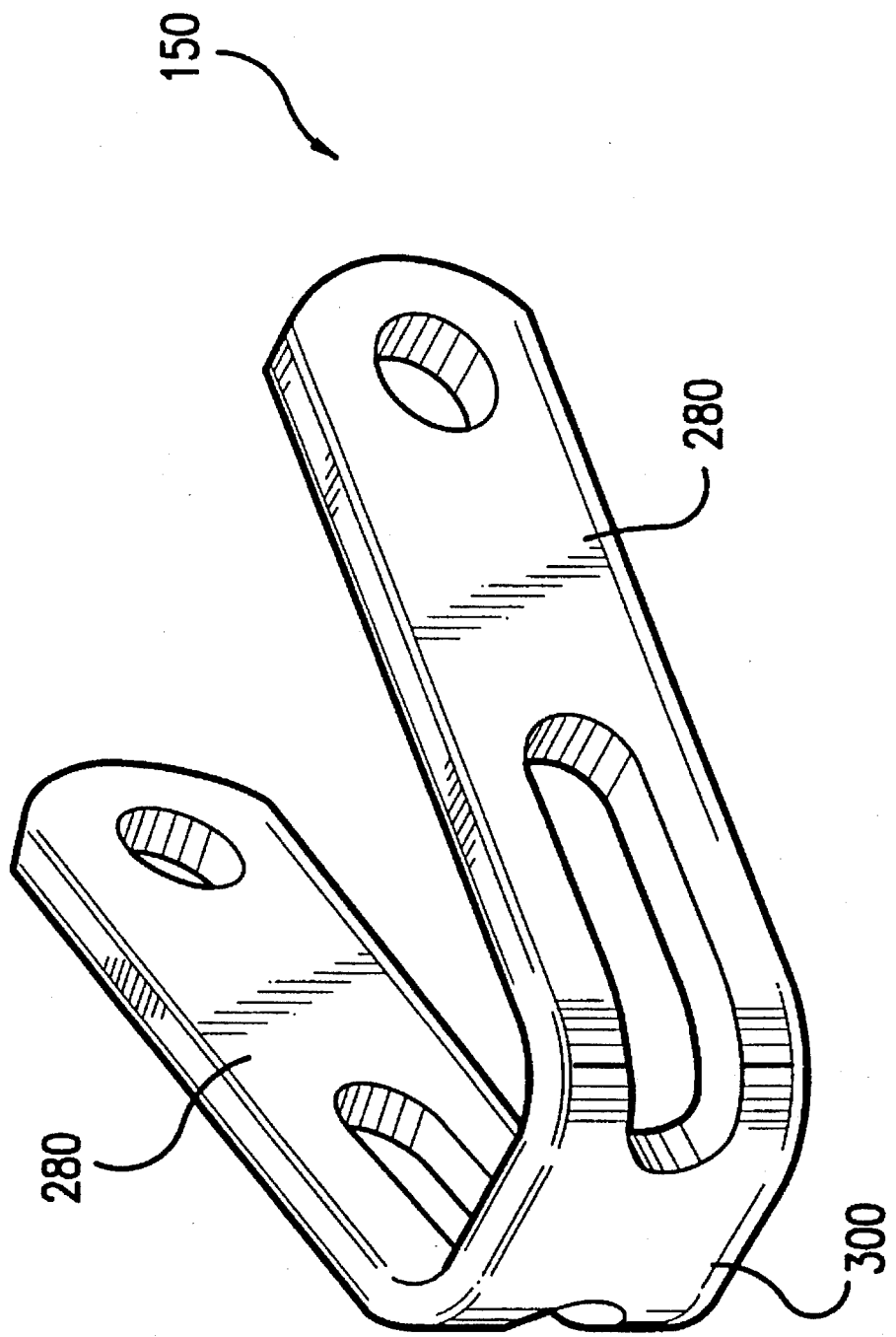
FIG. 14 is an illustration of a maximum collapse link in accordance with a further embodiment of the present invention.
Figure 15:
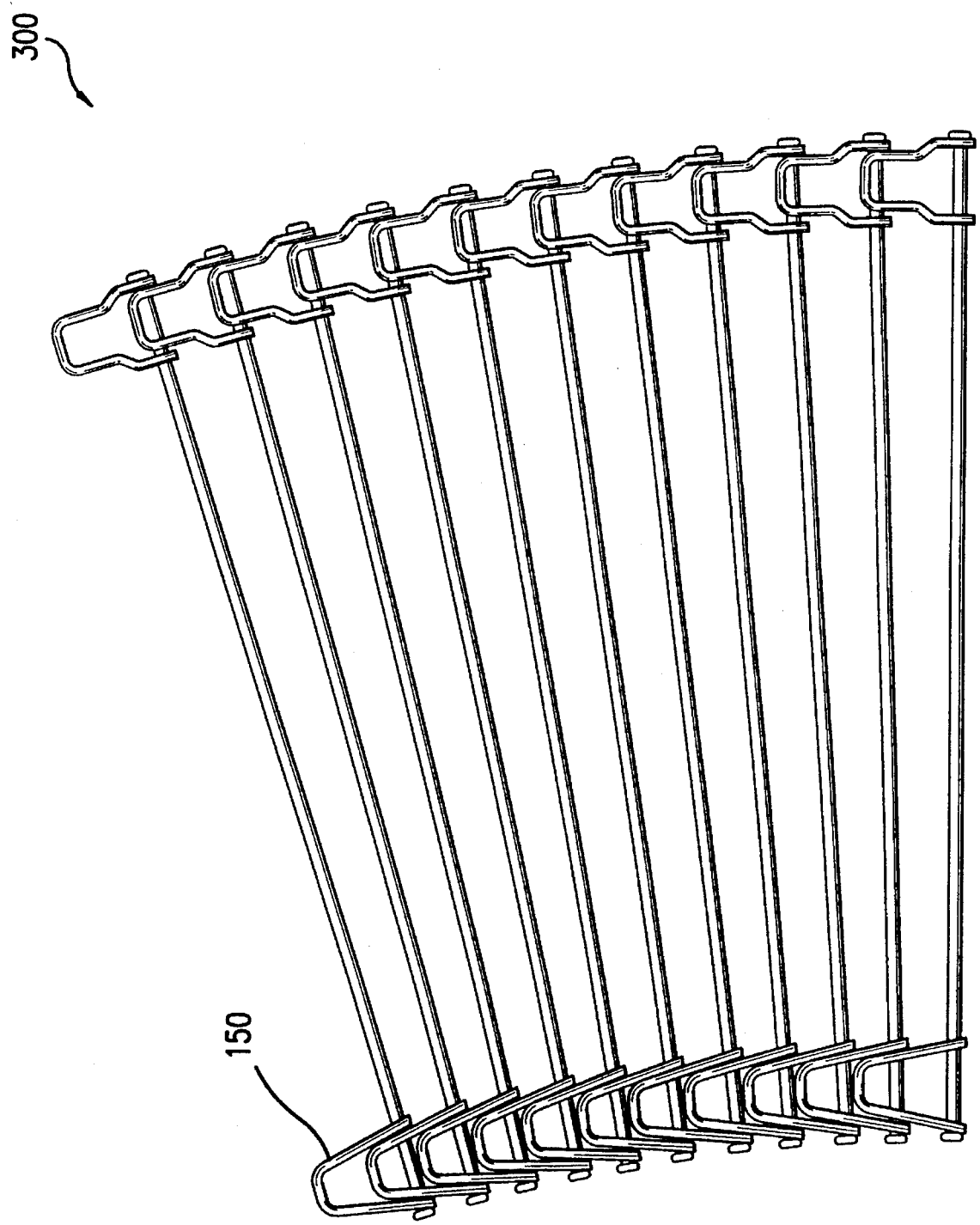
FIG. 15 is a plan view of a conveyor belt in accordance with a second embodiment of the present invention.

Referring to FIGS. 14 and 15, maximum collapse link 150 is illustrated in accordance with a second embodiment of the present invention. Link 150 includes a transversely spaced, longitudinally extending legs 280 connected together at one end by a base portion 300. Unlike legs 28 of the first embodiment, legs 280 do not have any stepped portions. Instead, link 150 is generally U-shaped in configuration. Legs 280 are slightly divergent in order to assure the maximum collapsibility or nestability of link 150 within an adjoining link.

Ideally, link 150 would be used on both the inner and outer edges of a conveyor belt in order to allow for a reduced turn radius in horizontal curves in both directions. As in the case in conveyor belt 2, however, this would create an accumulated shug over twelve links of approximately 0.83"; a value too great to assure belt travel in a straight path. Therefore, as shown in FIG. 15, link 150 is utilized on the inner edge of belt 300 and a stepped prior art link such as that shown in FIG. 4(A)–(C) is utilized on the outer edge of the belt. Thus, link 150 achieves the desired reduced radius of curvature along one edge, approximately 1.6–1.7, and the outer link limits the shug over twelve pitches to approximately 0.49". This amount of shug is within an acceptable range to ensure the straight travel of the conveyor belt along a straight path.

Figure 16:
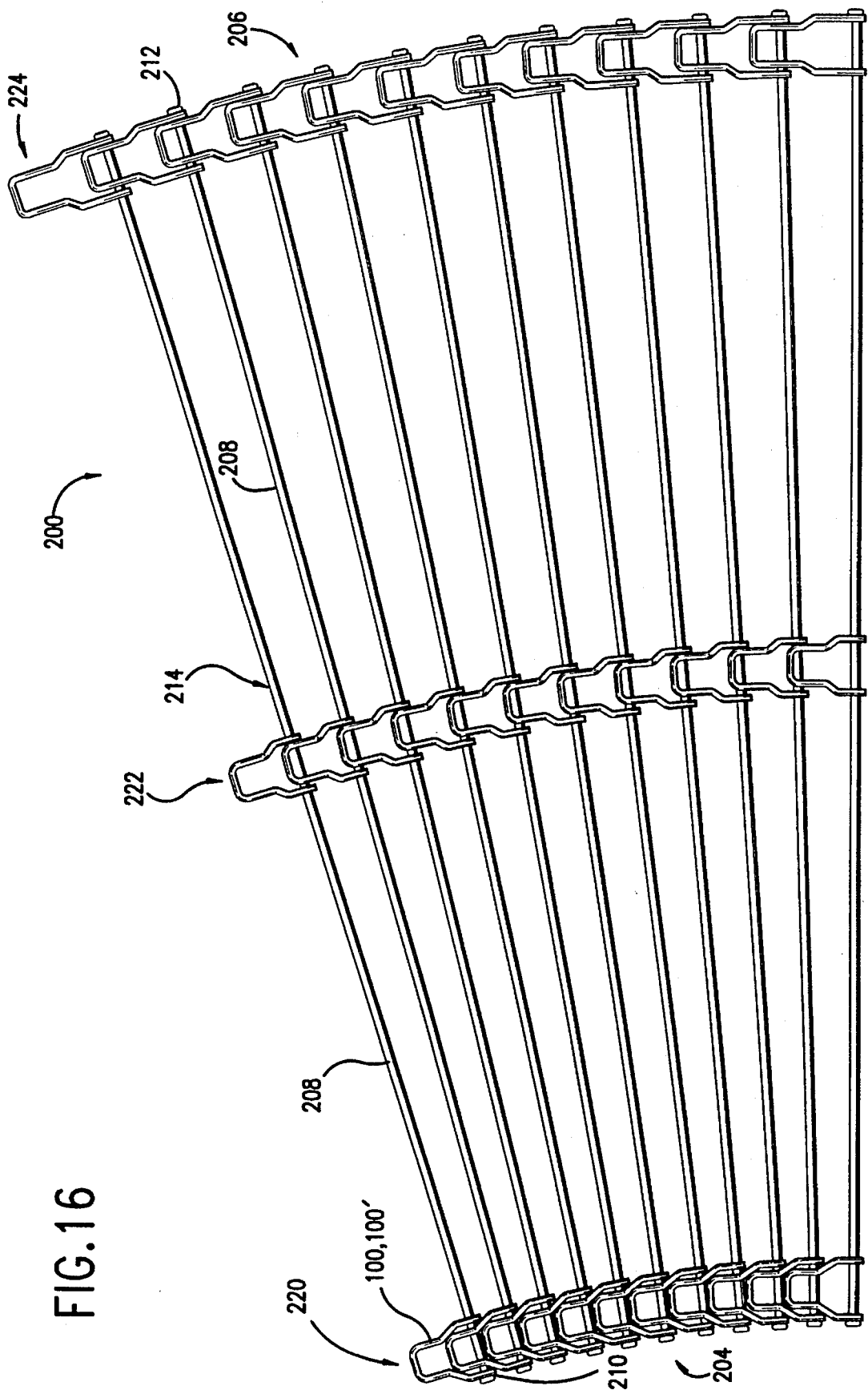
FIG. 16 is a plan view of a conveyor belt in accordance with a third embodiment of the present invention.
Figure 17B:
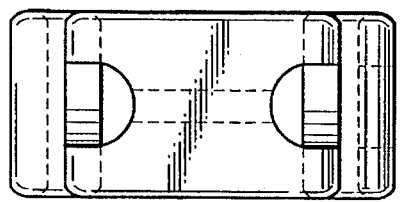
FIG. 17 (A)–(C) is a plan, end and side view of the outer link configuration shown in the conveyor belt of FIG. 16.
Figure 17A:
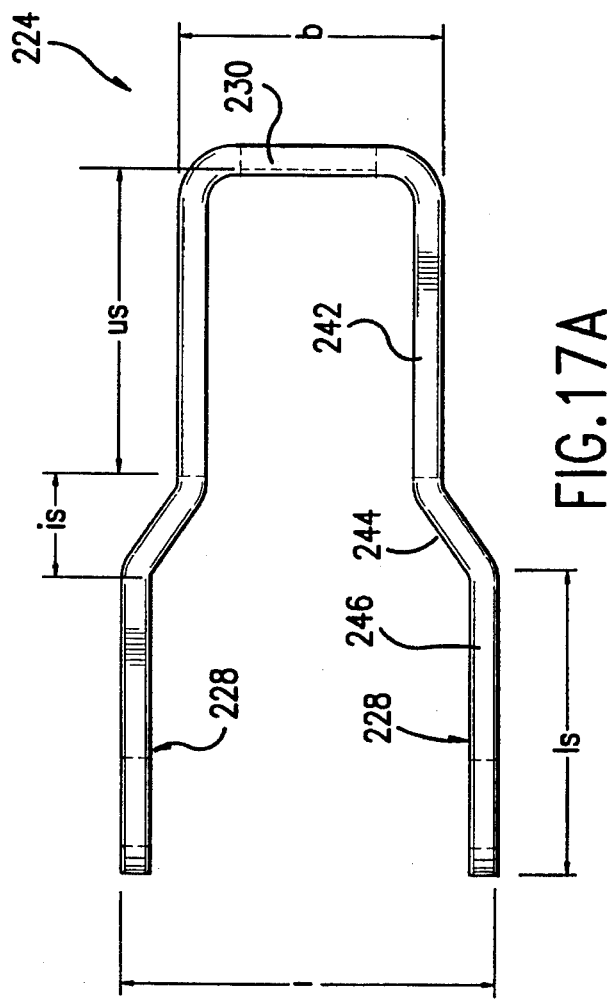
Figure 17C:
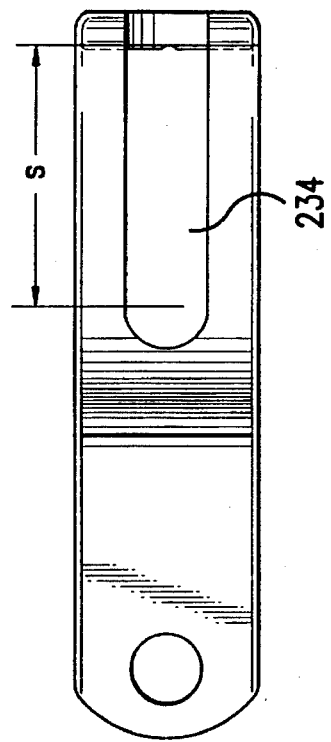

Referring next to FIGS. 16–18, a third embodiment of the present invention is illustrated by conveyor belt 200. Conveyor belt 200 is also a grid type belt having a plurality of longitudinally spaced, transversely extending rods 208. Rods 208 have inner and outer ends 210 and 212 located respectively along the inner and outer edges 204 and 206 of belt 200 with central portions 214 extending between the inner and outer ends.

Pivotally interconnecting the rods 208 are a row of inner links 220, a row of central links 222, and a row of outer links 224. As in the previous embodiments, the links have welded attachments to the rods 208 or are attached by any other suitable means.

As described above, each of the connecting links 220, 222, 224 has two transversely spaced, longitudinally extending legs 228 connected together at one end by a base portion 230. Inner links 220 have a maximum collapse configuration generally identical to that of either link 100 or link 100". Outer link 224 is shown in detail in FIG. 17(A)–(C). Outer link 224 preferably has a base portion 230 width (b) of approximately 0.76" and an outer distance (1) between the free ends of legs 228 of approximately 1.100". The most notable difference from the previous embodiments, however, in the upper substantially straight link segment 242 having an elongated length (us) of approximately 0.88", the intermediate link segment 244 having a length (is) of approximately 0.32", and the lower substantially straight link segment 246 having an elongated length (ls) of approximately 0.94". The length of slot 234 is also elongated to approximately 0.78". Central link 222 is shown in detail in FIGS. 18(A)–(C). Central link 222 preferably has a base portion 230' with a width (b) of approximately 0.76" and an outer distance (1) between the free ends of the legs 228' of approximately 1.075". The upper substantially straight link segment 242' preferably has a length (us) of approximately 0.60", the intermediate link segment 244' has a length (is) of approximately 0.24" and the lower substantially straight link segment 246' has a length (ls) of approximately 0.65". The length of slot 234' may be shortened to approximately 0.26".

All of the connecting links 220, 222, 224 are longitudinally expandable and collapsible by virtue of the slots 34, 234, 234' provided therein. However, as shown, outer links 224 are substantially longer than inner and central links 220 and 222. Moreover, when the belt 200 is in its normal orientation, the slots 234 of the outer links 224 extend forwardly in front of the slots 34, 234' in the inner and central links, respectively, so that the outer links 224 can be collapsed when the inner and central links are fully expanded.

As more fully shown in the '655 patent, when belt 200 is traveling in its normal orientation following a straight path, inner links 220 and central links 222 are fully expanded with the rods 208 being disposed in a tractive engagement with the front ends 36, 236' of slots 34, 234'. Outer links 224 are fully collapsed with no tractive engagement occurring between the rods 208 and the links 224. Thus, the tractive load on belt 200 is distributed evenly over the inner links 220 and central links 222 in the belt's normal straight orientation.

As belt 200 begins traversing a horizontal curve, inner links 220 will begin collapsing from their fully expanded position, central links 222 will remain approximately in their fully expanded position, and outer links 224 will begin expanding from their fully collapsed position, as shown in FIG. 16. The curved direction of travel is indicated by arrow B. Unlike some grid or flat wire belts which can collapse along either edge, belt 200 according to the present invention can collapse only along its inner edge 204. Outer edge 206 of belt 200 cannot be collapsed, but only expanded, from its straight travel orientation. Therefore, belt 200 is adapted to traverse horizontal curves all of which bend in the same direction, i.e., to the same side, relative to the normal straight path. Depending on the design of belt 200, alternate tractive conditions may occur as the belt 200 traverses horizontally curved paths of varying radii.

As shown in FIG. 16, a first tractive loading condition occurs as soon as the belt begins to bend laterally from its normal straight orientation into a curved orientation. Thus, the inner links 220 collapse from their fully expanded tractive condition and transfer their load to the central belt links. The outer links 224 begin to expand, but are not yet fully expanded to bear a tractive load. At that point, the entire tractive load on the belt is carried by the central belt links. As shown, the inner links reach their fully collapsed position prior to outer links 224 reaching a fully expanded position.

Alternatively, if central links 222 are moved inward closer to inner links 220, the inner belt links can continue to collapse until the outer links become fully expanded and share the tractive load with the central links. In addition, the inner links can further collapse from this second condition to result in a partial collapse of the central links. In this third condition, the entire tractive load on the belt is transferred to the outer links. The belt 200 may be designed with the pitch of the various links correlated to permit the belt to reach one, two or all three of the alternative loading conditions. In a preferred embodiment, only the first loading condition is achieved.

As illustrated in FIG. 16 for the preferred embodiment, conveyor belt 200 has a minimum inside turn radius of 0.85 times the overall width of the belt. By relocating central links 222 further inward, and allowing the full expansion of outer links 224, an even smaller turn radius may be obtained.

Although the present invention has been illustrated in terms of preferred embodiments, it will be obvious to one of ordinary skill in the art that numerous modifications may be made without departing from the scope of the invention which is to be limited only by the appended claims.

I claim:

1. A conveyor belt having a direction of travel, said belt comprising:

a plurality of pivotal transverse rods extending laterally across the belt and having inner and outer ends along inner and outer edges of the belt, a plurality of connecting links disposed in a pair of spaced rows at the inner and outer ends of said rods, each of said connecting links having a pair of longitudinally spaced first openings extending laterally therethrough, said rods extending through said first openings to interconnect said connecting links in transverse rows;

each of said connecting links having a base portion and a pair of spaced legs rigidly connected to the outer ends of said base portion;

each of said legs having at least one stepped portion parallel to the direction of travel, said stepped portions on opposing legs being spaced apart a relatively narrow distance at said base portion and a relatively wide distance at the opposite end thereof, said stepped portions including a substantially straight segment at said narrower stepped portion, a substantially straight segment at said wider stepped portion, and an angled segment therebetween connecting said substantially straight segments;

said links being arranged in partially nested relation with narrower stepped portions of respective ones of said links being received in closely fitting sliding relation within the wider stepped portions of adjoining links;

the inner surfaces of said wider stepped portions having said substantial straight segment ahead of the adjoining outer surfaces of said narrower stepped portions and said adjoining outer surfaces having said substantially straight segment at said narrower stepped portion extending behind said inner surfaces when the belt is in normal portion for straight travel to permit said adjoining outer surfaces to slide forward within said inner surfaces when said inner connecting links collapse for curved travel; and wherein said angled segment between said substantially straight segments of said stepped portion of said inner connecting links is greater in length than said angled segment between said substantially straight segments of said stepped portion of said outer connecting links;

wherein the shorter length of said outer angled segments maintains the direction of travel of said belt in a normal straight orientation by limiting the amount of lateral clearance between adjoining said connecting links; and wherein the longer length of said inner angled segments allow adjoining said inner links to fully collapse in an alternate orientation to follow paths curved laterally to one side.

2. The conveyor belt of claim 1 wherein at least one of said first openings in each connecting link forms a longitudinally extending first slot, said transverse rods being slidable along said first slots to permit longitudinal collapsing of said belt during travel thereof around lateral curves, said longitudinal collapsing being graduated transversely thereof.

3. The conveyor belt of claim 2 wherein said base portions of said inner connecting links are narrower than said base portions of said outer connecting links.

4. The conveyor belt of claim 2 wherein said spaced legs of said inner connecting links define a distance therebetween greater than a distance between said spaced legs of said outer connecting links.

5. The conveyor belt of claim 2 wherein said substantially straight segment at said wider stepped portion of said inner links is shorter in length than said substantially straight segment of said wider stepped portion of said outer links.

6. The conveyor belt of claim 2 wherein said substantially straight segment of said narrower stepped portion of said inner links is shorter in length than said substantially straight segment of said narrower stepped portion of said outer links.

7. The conveyor belt of claim 1 further comprising a plurality of central links pivotally interconnecting central portions of said rods, and wherein said inner links pivotally interconnect inner portions of said rods and said outer links pivotally interconnect outer portions of said rods, said inner links and said central links having a normal fully expanded and tractive condition in a normal straight orientation, and said outer links having a normal collapsed condition in said normal orientation and said outer links expanding from said normal condition in alternate curved orientations.

8. A conveyor belt having a normal orientation to follow one path and an alternate orientation to follow an alternate path curved laterally to one side of said one path, said belt comprising:

a plurality of longitudinally spaced rods extending laterally across the belt and having inner and outer ends along inner and outer edges of the belt and central portions therebetween;

link means arranged in at least one longitudinal row along each edge of the belt for pivotally interconnecting the inner and outer ends of said rods;

said inner and outer link means having a normal fully expanded and tractive condition in said normal orientation;

said inner link means having a fully collapsed condition in said alternate orientation and said outer link means maintaining the fully expanded and tractive condition in said alternate orientation;

wherein said inner aria outer link means are defined by a leading end and a trailing end, said leading end defining a first link width and said trailing end defining a second link width;

wherein the differential between the first link width and the second link width is greater for said inner link means than said outer link means such that the collapsibility of said inner link means is greater than the collapsibility of said outer link means.

9. The conveyor belt of claim 8 wherein said inner and outer link means includes inner and outer links having longitudinal slots slidably receiving said rods to permit said longitudinal collapsibility of said inner links.

10. The conveyor belt of claim 8 wherein each of said links comprises a base portion and a pair of spaced legs rigidly connected to the outer ends of said base portion, each of said legs of said inner links flaring outward from said base portion such that said base portion and said legs of said inner links define a generally U-shaped configuration, each of said legs of said outer links including at least one stepped portion parallel to said one path and said stepped portions on opposing legs being spaced apart a relatively narrow distance at said base portion and a relatively wide distance at the opposite end thereof.

11. The conveyor belt of claim 10 wherein said U-shaped configuration of said inner links permits the full collapsibility of said inner links within adjoining said inner links.

12. The conveyor belt of claim 11 wherein said stepped portions of said outer links maintains an acceptable amount of shug and thereby maintains the lateral movement of said conveyor belt to a greater degree than said inner links.

13. The conveyor belt of claim 8 wherein each of said links comprises a base portion and a pair of spaced legs rigidly connected to the outer ends of said base portion, each of said legs of each said links including at least one stepped portion parallel to said one path and said stepped portions on opposing legs being spaced apart a relatively narrow distance at said base portion and a relatively wide distance at the opposite end thereof.

14. The conveyor belt of claim 13 wherein said stepped portions include a substantially straight segment at said narrower stepped portion, a substantially straight segment at said wider stepped portion, and an angled segment therebetween connecting said substantially straight segments, said angled segment between said substantially straight segments of said stepped portion of said inner links being greater in length than said angled segment between said substantially straight segments of said stepped portion of said outer links such that the shorter length of said outer angled segments maintains the direction of travel of said belt in a normal straight orientation by limiting the amount of lateral clearance between adjoining said outer links and the longer length of said inner angled segments allow adjoining said inner links to fully collapse in said alternate orientation to follow paths curved laterally to one side.

15. In a conveyor system having a substantially straight portion and a laterally curved portion, a conveyor belt having a direction of travel and a normal orientation for following said substantially straight portion and an alternate orientation for following said curved portion with the belt defining a concave inner edge and a convex outer edge along said curved portion, said conveyor belt including a plurality of longitudinally spaced rods extending laterally across the belt and having inner and outer ends along the inner and outer edges of the belt; link means including inner links and outer links interconnecting the inner and outer ends of said rods, said link means being at least collapsible along said inner edge; each of said links comprising a base portion and a pair of spaced legs rigidly connected to the outer ends of said base portion, opposing said legs on each link being spaced apart a relatively narrow distance at said base portion and a relatively wide distance at the opposite end thereof, the collapsibility of said inner links being dictated by the spacing of said spaced rods such that collapse of said inner links terminates with contact between said spaced rod and said base portion of said inner link, and wherein the differential between the relatively narrow distance at said base portion and the relatively wide distance at the opposite end thereof is greater for mid inner links than said outer links.

* * * * *